United States Patent [19]

Snyder

[11] Patent Number: 5,160,393
[45] Date of Patent: Nov. 3, 1992

[54] FRICTION WELDER HAVING AN ELECTROMAGNETIC DRIVE WHICH PRODUCES ORBITAL MOTION

[75] Inventor: Edward A. Snyder, Brockport, N.Y.

[73] Assignee: Hydroacoustics, Inc., Rochester, N.Y.

[21] Appl. No.: 634,666

[22] Filed: Dec. 27, 1990

[51] Int. Cl.⁵ .............................................. B29C 65/06
[52] U.S. Cl. .................................. 156/73.5; 156/580; 310/15
[58] Field of Search ................ 156/580, 580.1, 73.5; 228/2; 310/15, 17, 36

[56] References Cited

U.S. PATENT DOCUMENTS

| Re. 22,549 | 9/1944 | Plensler | 172/36 |
| 2,823,323 | 2/1958 | Lamm | 310/20 |
| 3,060,334 | 10/1962 | Fabre | 310/38 |
| 3,452,227 | 6/1969 | Welch | 310/82 |
| 3,548,225 | 12/1970 | Vit | 310/38 |
| 3,554,845 | 1/1971 | Billett et al. | 156/580 |
| 3,732,613 | 5/1973 | Steigerwald | 156/73.5 |
| 3,920,504 | 11/1975 | Shoh | 156/580 |
| 4,058,935 | 11/1977 | Smilg | 51/163.1 |
| 4,086,122 | 4/1978 | Bouyoucas | 156/73.5 |
| 4,247,346 | 1/1981 | Maehara et al. | 156/73.5 |
| 4,715,523 | 12/1987 | Lebedev et al. | 228/2 |
| 4,764,695 | 8/1988 | Inoue | 310/20 |
| 4,801,829 | 1/1989 | Baba | 310/36 |
| 5,005,773 | 4/1991 | Nyberg et al. | 241/30 |

FOREIGN PATENT DOCUMENTS

| 852301 | 1/1940 | France | 310/36 |
| 967734 | 10/1982 | U.S.S.R. | 228/2 |
| 984772 | 1/1983 | U.S.S.R. | 228/2 |
| 984774 | 1/1983 | U.S.S.R. | 228/2 |
| 1050835 | 10/1983 | U.S.S.R. | 228/2 |
| 1360936 | 12/1987 | U.S.S.R. | 228/2 |
| 917684 | 2/1963 | United Kingdom | |

OTHER PUBLICATIONS

"Joining Plastics in Production"–Published by The Welding Institute (1988)–Ed. by M. N. Watson, pp. 73–82.

R. A. Grimm, Welding Journal, pp. 23–28, Mar. 1990.

Primary Examiner—Michael W. Ball
Assistant Examiner—Steven D. Maki
Attorney, Agent, or Firm—Martin Lukacher

[57] ABSTRACT

An electromagnetically actuated friction welder produces orbital motion at interfaces between parts (usually of thermoplastic material) to bond the parts by fusion generated by friction. This welder can also be operated alternatively to produce reciprocating vibratory forces thereby providing flexibility as to the selection of an orbital or reciprocating mode, depending upon the joint to be welded. The velocity of motion is controllable preferably around the resonant frequency of the driven structure by adjusting the frequency of the AC power which operates the electromagnetic drive motor of the welder. A plate which carries one of the parts to be welded and which is driven is flexurally mounted for movement in an orbital plane or planes containing the interfaces without substantial tilting by an array of stiff members, such as rods, located around the drive motor, attached to the plate at one end and to a tubular structure at the opposite ends thereof. The tubular structure is desirably attached to a massive support carried by the frame of the welder.

28 Claims, 8 Drawing Sheets

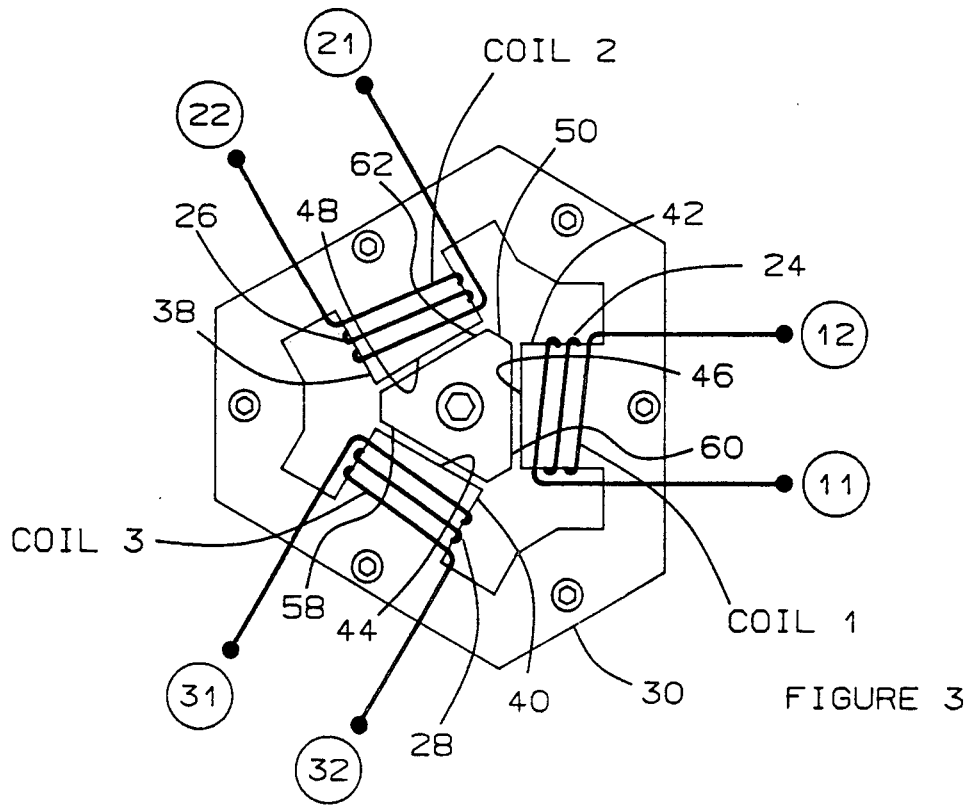
FIGURE 3
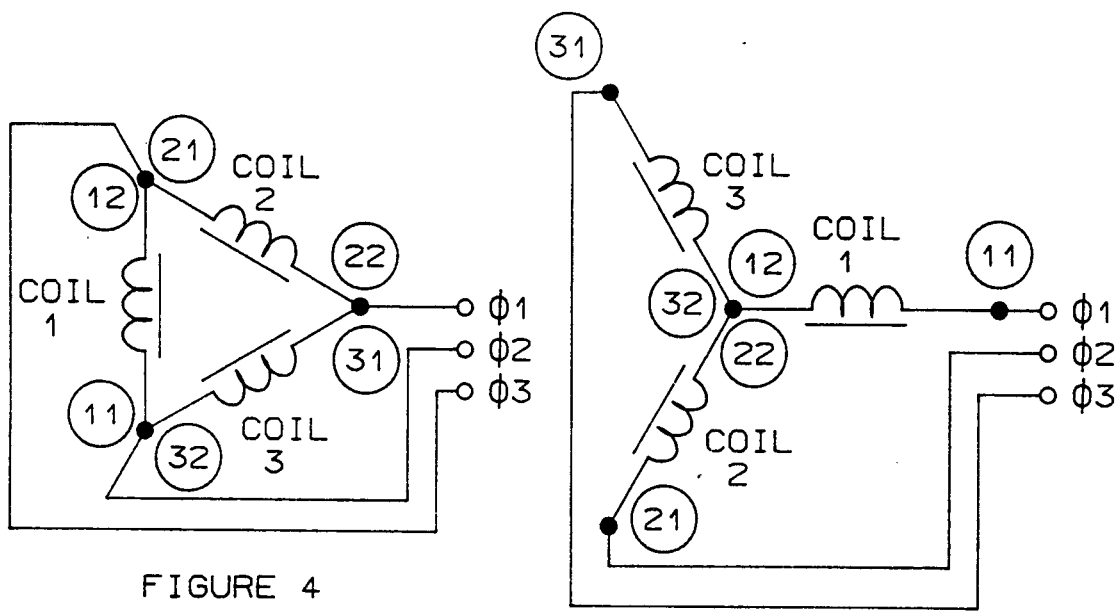
FIGURE 4
FIGURE 5

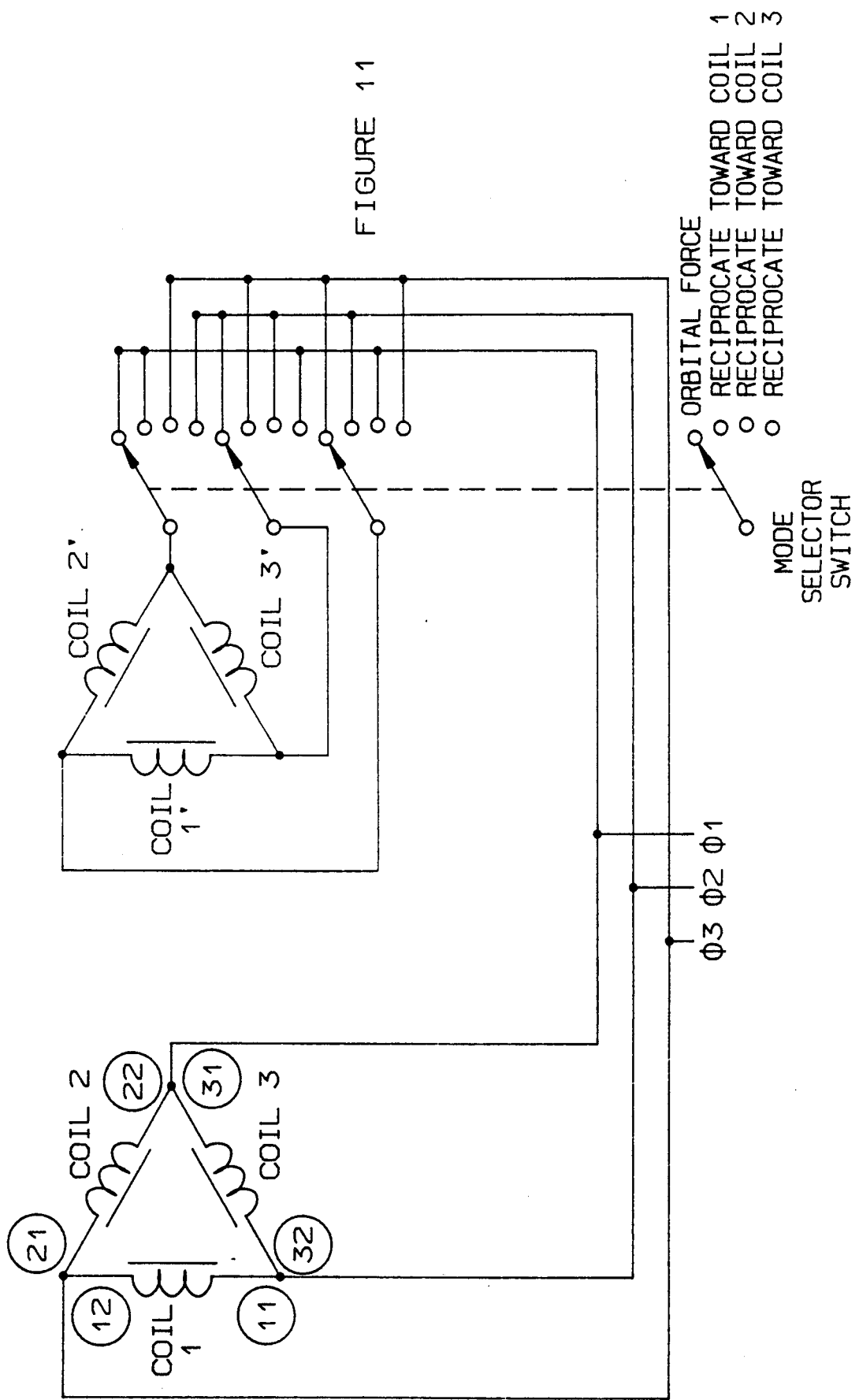

FRICTION WELDER HAVING AN ELECTROMAGNETIC DRIVE WHICH PRODUCES ORBITAL MOTION

DESCRIPTION

The present invention relates to welding apparatus and particularly to an electromagnetically driven welder which can be operated to generate orbital forces and deliver them in a plane in which the joint of the parts to be welded is located. The invention also relates to an electromagnetic motor, especially adapted for use in the welder, for driving a part to be welded with orbital motion which motion is constrained to be in a plane without substantial out of plane motion.

The welder provided by the invention is especially suitable for use in the welding of thermoplastic parts by means of forces (either orbital or translational vibratory forces) which induce friction heating in the parts at the joint (the interface of the surfaces to be welded) so as to cause the parts to fuse at their interface surfaces and bond together as the parts cool. Other applications of the invention and of the electromagnetic orbital drive motor are also possible.

Friction welders which operate in a translational (reciprocating) vibratory mode are commercially available. Such welders may be electromagnetically driven (see U.S. Pat. No. 3,920,504 issued Nov. 18, 1975) or hydraulically driven (see Bouyoucos, Behnfeldt and Selsam, U.S. Pat. No. 4,086,122 issued Apr. 25, 1978). Neither hydraulic nor electromagnetic drivers suitable for friction welding have been available which are capable of orbital forces substantially constrained to, and particularly forces a plane in which the surfaces at the interface of the parts at which the weld joint is to be formed can be restricted.

Orbital welding has advantages over linear vibration welding where the forces are translational and drop to zero velocity (stop) at the end of each displacement in an opposite direction. This is because frictional welding is a resistance process and the heat is proportional to the product of the resistance forces and the relative velocity of the parts. In orbital motion, the velocity remains constant as the parts are rubbed and heated to melting temperature. It is therefore possible to generate the same heat as is generated with reciprocating welding with less displacement of the parts and with less force than is the case for reciprocating welding. The peak displacement and velocity requirement is reduced by 29% (1/square root of 2). Reduction in displacement enables the use of smaller weld flanges on the parts to be welded. With a vibratory or reciprocating weld, the parts stop at either end of a vibration cycle so that the heat generation is cyclic. With orbital motion the welder produces constant heat at the joint because the velocity magnitude is constant, thus faster welding with less displacement is possible using the orbital process. Orbital welding also has advantages over spin welding in which parts are spun about an axis. In spin welding, rotational forces and heating effects on the parts vary with the radial distance from the center of rotation of the spinning parts. The velocity and heating effect is not uniform in a radial direction across the interface where the parts are to be bonded. Spin welding is also generally restricted to applications where a part is circular in geometry.

There are parts, however, which are not amenable to welding with orbital motion, but are amenable to welding by linear motion. Therefore, it is desirable to provide a welder which can execute either linear, reciprocating or orbital motion, as may be desired. Reciprocating welding is readily accomplishable in a plane in which the joints are disposed, usually held in a welding head on a platen. It is difficult to achieve orbital motion without generating additional motion which is not in the orbital plane because the platen, which holds one of the parts to be welded against the other in a press or clamping mechanism, has the tendency to tilt and cause the parts to lose contact. It is a feature of the invention to provide an electromagnetic orbital drive especially suitable for use in a friction welder wherein the motion is restricted substantially into a plane (the orbital plane).

Accordingly, it is the principal object of the present invention to provide an improved friction welder.

It is another object of the invention to provide an improved frictional welder which may be operated alternatively in a translational (reciprocating) vibratory mode or in an orbital mode.

It is the still further object of the present invention to provide an improved electromagnetic orbital drive and a friction welder wherein the drive is included and wherein orbital motion is provided restricted substantially in an orbital plane.

Briefly described, apparatus embodying the invention for friction welding of parts at an interface therebetween includes means for driving at least one of the parts with orbital movement with respect to another of the parts while the parts are held in contact at the interface (where the welded joint is to be formed). The driving means comprises electromagnetic force generating means which produces orbital force in an orbital plane. The welder also includes means for mounting the part which executes orbital motion in response to the orbital force so as to locate the interface to be welded between the parts in the orbital plane. The mounting means is preferably an array of flexural elements having like stiffness in all directions parallel to the orbital plane; for example, rods encompassing the electromagnetic orbital drive which are connected at one end to a plate which is driven by the orbital force and at the other end to a massive support.

It has also been found in accordance with the invention, that the orbital velocity (the velocity of the orbital motion of the orbitally driven member) can be controlled in response to the third harmonic of current which is applied to the electromagnetic orbital drive. By responding to the third harmonic, the frequency of the AC power is controlled so as to be at a desired frequency, preferably the frequency at which the orbital drive structure including its flexural (spring) supports, is resonant.

The foregoing and other objects features and advantages of the invention as well as presently preferred embodiments thereof will become more apparent from the reading of the following description in connection with the accompanying drawings in which:

FIG. 3 is a more detailed diagram illustrating the orbital drive motor and the connections of the coils thereon, the coils being shown schematically in the Figure;

FIG. 4 is a schematic diagram illustrating delta wiring of the coils of the orbital motor for full output and minimal current distortion;

FIG. 5 is a schematic diagram showing wye wiring of the coils of the electromagnetic orbital motor which provides one-third the output force of the delta connected coil configuration shown in FIG. 4;

FIG. 11 is a schematic diagram of the circuit of the two orbital electromagnetic drive motors with switching so as to select either net orbital or vibrating (reciprocating force).

Figure 1:
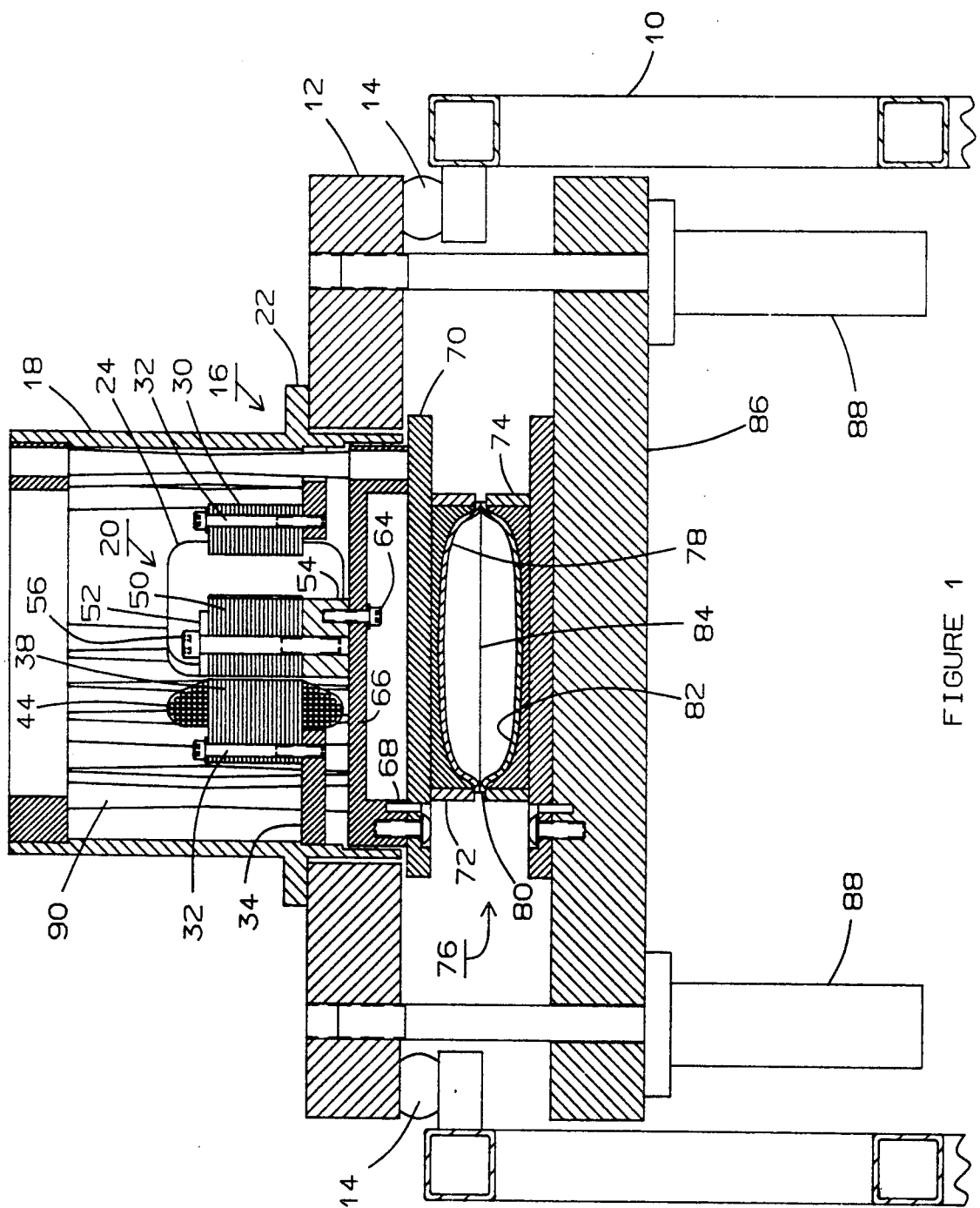
FIG. 1 is a sectional front view of a friction welder embodying the invention; the section being taken along the line 1—1 in FIG. 2.
Figure 2:
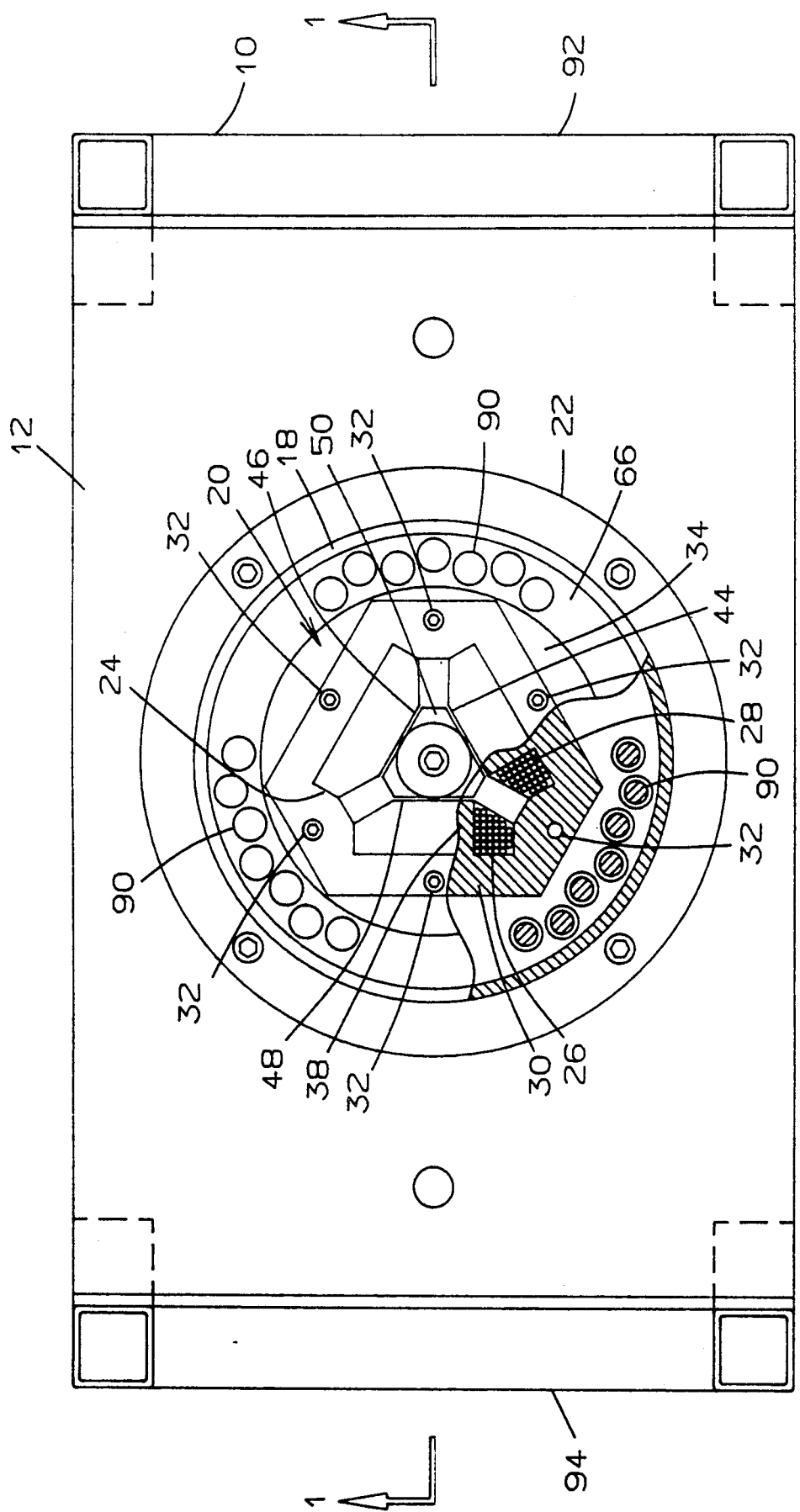
FIG. 2 is a plan view of the welder shown in FIG. 1 partially broken away to illustrate the electromagnetic drive motor and the support which provides orbital motion in an orbital plane in greater detail.

Referring more particularly to FIGS. 1 and 2, there is shown a framework 10 of a friction welder made up of steel tubes. A massive support plate 12 is mounted on vibration isolation or shock mounts 14, thereby mounting the plate 12 and the rest of the welder on the framework 10. The mass of the plate 12 is desirably much greater than the mass of the moving parts of the system, and, for example, may be 200 pounds as compared to the mass of the moving parts which may be approximately 25 lbs. The plate 12 may for example be steel 2 inches in thickness and 20 inches in diameter. The sizes mentioned are for an exemplary welder. It will be appreciated that the electromagnetic orbital drive may be made smaller, if desired, so as to enable the construction of reduced scale vibration welders, much smaller than vibration welders of the type presently commercially available and as described in the above-referenced patents. For example, the weld head 16 of the welder may be reduced in size to a size comparable of ultrasonic welding heads. Where higher force output is desired, a plurality of drivers which provide forces which add may be used. A welder using two drivers is described hereinafter in connection with FIGS. 9 through 11.

The weld head includes a tubular structure 18 having an opening in which the electromagnetic driver or motor 20 is contained. A flange 22 connects the tubular structure to the massive support plate 12.

The motor 20 is adapted to be driven by three phase AC power applied to coils 24, 26 and 28 on a stator 30. (See also, FIG. 3.). The stator 30 is a single body of magnetic material made up of laminations of steel of the type used in electric motors which are disposed in a stack mounted by bolts 32 on a ring 34 which is attached, as by welding to the tubular structure 18. The stator 30 is generally triangular in cross section with the apexes of the triangular shape cut off for conservation of material and space. The stator defines a ring which affords a magnetic return path for flux generated by the coils. Poles 38, 40 and 42 around which the coils 26, 28 and 24, respectively are wound, project inwardly towards a central axis which is defined by bisectors of each angle of the triangular shape; the triangular shape being equilateral. The coils may be wound in two sections and connected together for ease of installation. While it is preferable to use coils disposed around the stator poles 44, 46 and 48 as shown, the coils may be wound around the sections of the corners of the stators where the bolts 32 are shown. In a typical motor, the area of the faces 44, 46 and 48 of the stator poles may be approximately 3 square inches. The number of turns in a typical motor may be 200. The motor has an armature 50, which like the stator, is a single body of magnetic material made up of a stack of laminations which are clamped between a washer 52 and a stub 54 by a bolt 56.

The armature is generally triangular in cross-section and has pole faces along each of its sides (sides of an equilateral triangular shape). These faces 58, 60 and 62 (see FIG. 3) are opposed to and separated by air gaps from the stator pole faces 44, 46 and 48, respectively. The width of each gap may, for example, be 0.050 inches. All of the pole faces and the gaps are symmetrically disposed about the central axis of the armature. This axis is the longitudinal, central axis of the bolt 56. The width of the gap is desirably greater than the peak orbital motion of the armature, which may for example be 0.021 inches, so that the armature does not strike the stator.

The armature is connected by bolts, one of which 64 is shown in FIG. 1, to a drive plate 66 which may be circular and have a tubular flange 68 which is bolted to the platen 70 of the welder. This platen is connected to an orbitally moveable part 72 of a tool or fixture 76 which carries one of the parts 78 which is to be welded at weld flanges 80 to another part 82. The weld flanges have weld surfaces which define the interface 84 of the parts. The parts may be of thermoplastic material. The lower part 82 is fixedly held in the lower section 74 of the tool or fixture 76. This lower half is mounted on a clamp plate 86 which is reciprocated vertically by hydraulic cylinders 88 so that the parts can be clamped together at the interface with sufficient force that when the upper part 78 is moved orbitally by the motor 20 heat is generated which causes melting to take place at the interface.

In order to prevent tilting of the armature 50 at the interface, (causing loss of contact of the weld surfaces and reduced frictional forces which are developed as the upper weld part 78 executes orbital motion) the armature 50 and hence the upper part 78 is maintained in a horizontal orbital plane as shown at 84. This is accomplished by a flexural, spring support system for the armature 50, the drive plate 66, the platen 70 and the fixture part 72 which is attached thereto. This flexural support is provided by a symmetrical array of rods 90 mounted outboard of the stator - armature system to stabilize the platen motion and maintain the orbital forces in the orbital plane. These rods are elements which provide equal stiffness in the direction around their axes (i.e., parallel to the orbital plane). Circumferentially adjacent ones of the rods 90 are staggered so that alternate rods are radially, closer and further from the axis of the motor 20. This arrangement provides a constraint against tilting motion out of the orbital plane. The array also defines stiffness which with the mass of the orbitally moveable parts (the armature 50 and the fixture part 72 and the parts connected thereto) is a mechanical system resonant at the frequency of orbital motion. This is twice the frequency of the AC power which is applied to the coils 24, 26 and 28 of the stator poles 38, 40 and 42. The frequency of the motion is doubled because the electromagnetic forces are proportional to the square of the flux in the air gaps between the pole faces and therefore are proportional to the square of the voltage applied to the coils. It will be appreciated that orbital motion occurs because the forces on the armature are generated by the three phase flux which, because of frequency doubling, is 60° out of phase at each of the poles. At any point in the orbital plane this force produces motion which can be resolved into displacement, velocity or acceleration vectors which are in the same direction and can each be represented by vectors (parallel to the orbital plane or, in other words, perpendicular to the orbital axis) and are proportional in amplitude to the sine and cosine of twice the AC power line frequency (i.e., these vectors rotate at twice the frequency of the AC power).

Referring to FIGS. 3, 4 and 5, it will be seen that the coil 24 is designated as "coil 1," the coil 26 is designated as "coil 2" and the coil 28 is designated as "coil 3." These coils may be connected in delta with the ends of the windings indicated by the numerals within circles connected together as shown in FIG. 4 and the ends of the delta connected coils connected to the three phase power lines indicated as $\phi 1$, $\phi 2$ and $\phi 3$. Alternatively, and if less force is desired than for delta wiring, the coils may be connected in wye configuration as shown in FIG. 5. In wye mode, the force output is one-third the force output with delta connection and the current drawn from the lines is also reduced by one-third. The delta connection at resonance has a third harmonic of coil current which is 16 dB below the fundamental of the AC current, while the current from the AC drive has a fifth harmonic 28 dB below the fundamental. It is therefore seen that the delta connection reduces the harmonics in the current from the AC drive.

Figure 6:
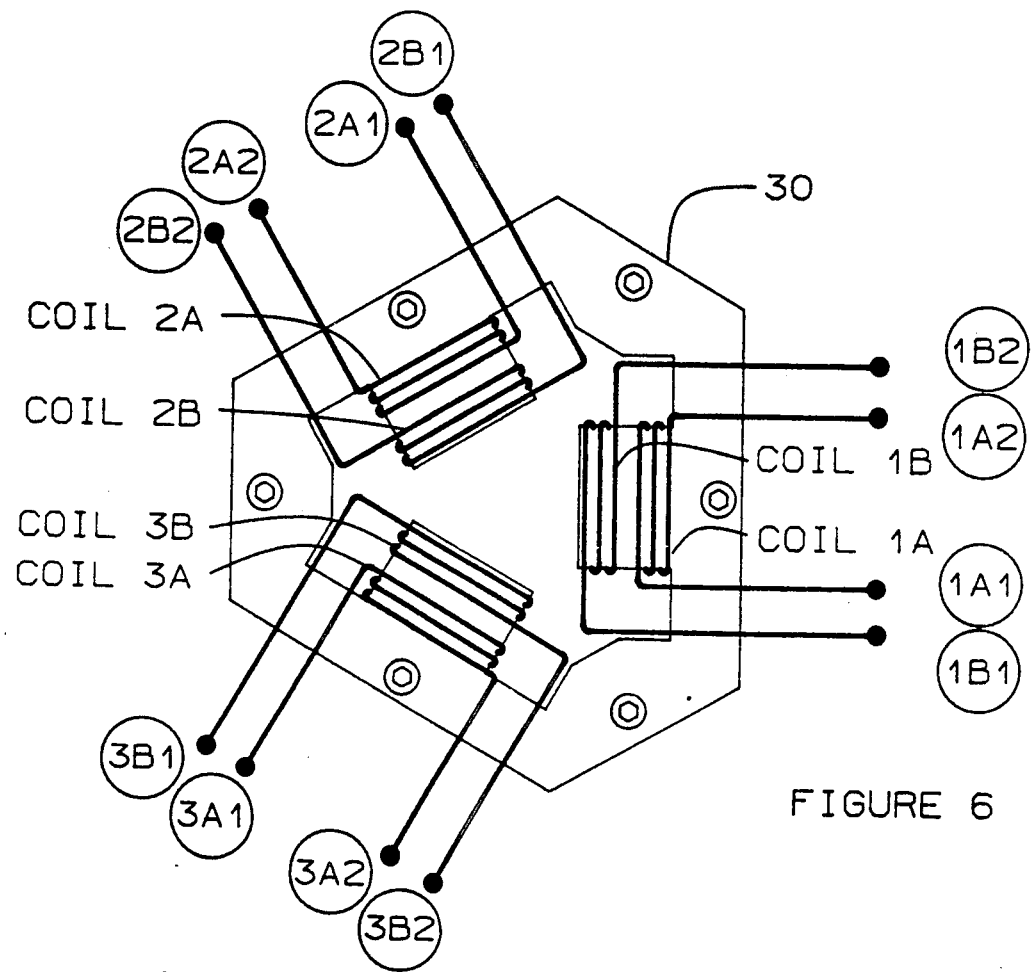
FIG. 6 is a schematic diagram similar to FIG. 3 showing the stator of an electromagnetic orbital motor with coils which can selectively be connected to provide orbital force or vibratory translational (reciprocating) force of half the magnitude of the orbital force provided by the configuration shown in FIG. 3.
Figure 7:
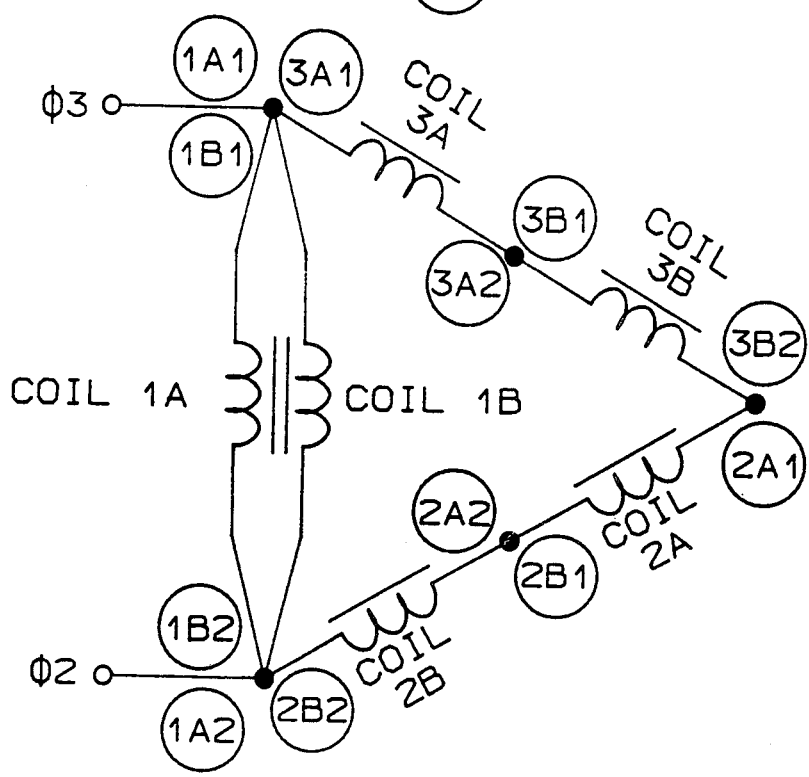
FIG. 7 is a schematic diagram showing the connections of the coils to provide reciprocating force with peak magnitude equal to half the peak orbital force.
Figure 9:
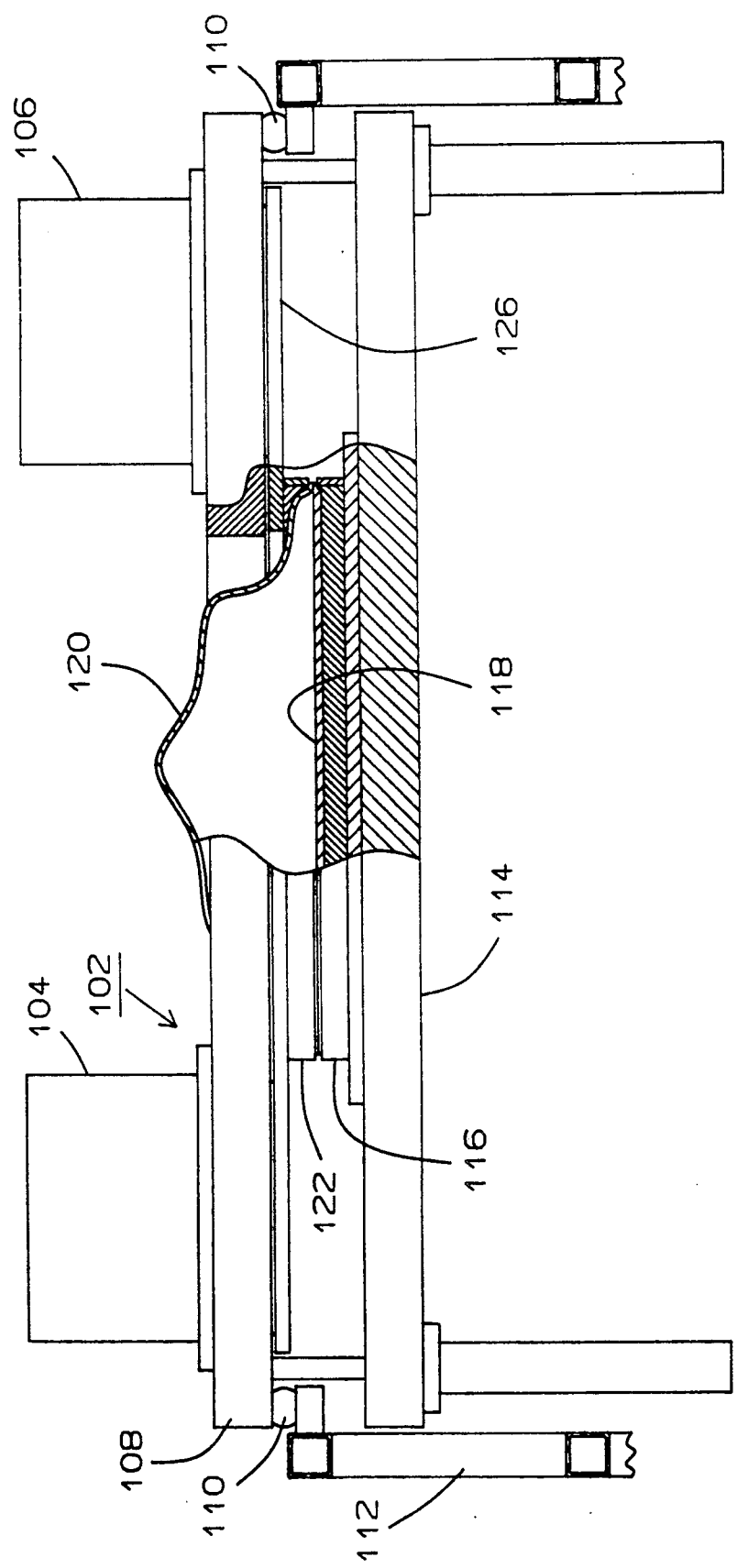
FIG. 9 is a front view partially broken away to illustrate an orbital/vibrational friction welder having two electromagnetic orbital drive motors which can be operated in the orbital or reciprocating drive mode.
Figure 10:
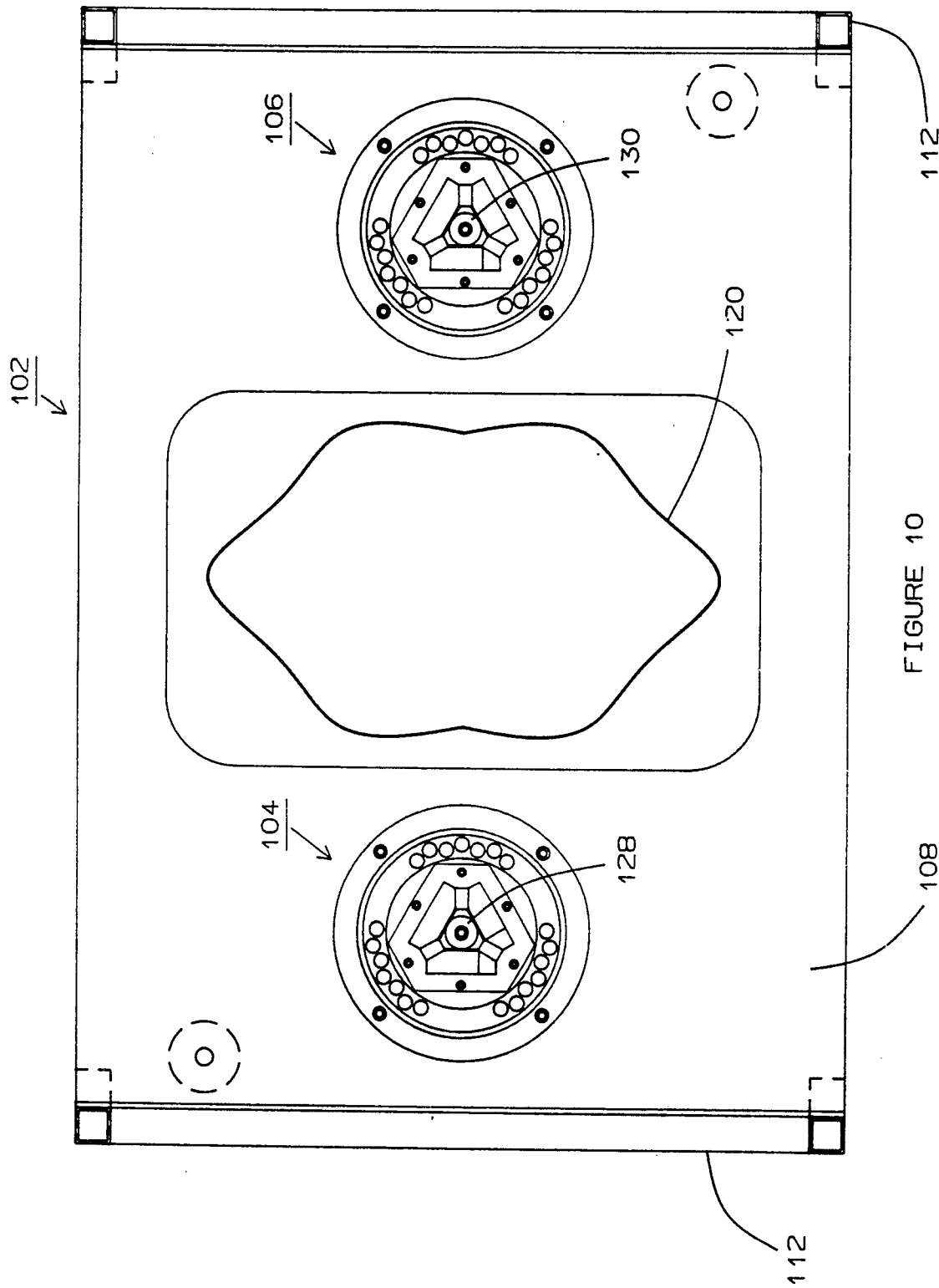
FIG. 10 is a plan view of the welder shown in FIG. 9.

Translational (reciprocating) vibratory force may be selected if two orbital motors are mechanically connected to the same load (the same drive plate) as shown in FIGS. 9, 10 and 11. Alternatively a single phase drive may be used with a single orbital driver to obtain reciprocating (linearly vibrating) force in a direction towards one of the pole faces. This may be accomplished by dividing each coil into two sections so that coil 1 is divided into coils 1A and 1B, coil 2 is divided into coils 2A and 2B and coil 3 is divided into coils 3A and 3B. The terminals of these coils are correspondently marked 1A1, 1A2 through 3B1, 3B2, as shown in FIGS. 6 and 7. By selectively connecting, for example coil 1A and B in parallel and the other coils in series linear vibrational (reciprocating) force is generated on the armature which is directed towards the face of the pole around which coil 1 is wound. When single phase AC power (as indicated in FIG. 7, for example, the power between phase two and phase three of the AC lines) is applied across the parallel connected coils 1A and 1B, the reciprocating force is approximately one-half the peak magnitude of the orbital force. Suitable switches may be used to connect the coil sections so as to receive single phase drive power, and into the series and parallel connections so as to provide the linear vibrating force in the desired one of the three directions. With the configurations shown in FIGS. 1 and 2, it will be desirable for the parallel connected coils to be those on pole 38. Then the linear direction of vibrating reciprocation will be along the line between the ends 92 and 94 of the welder.

Figure 8:
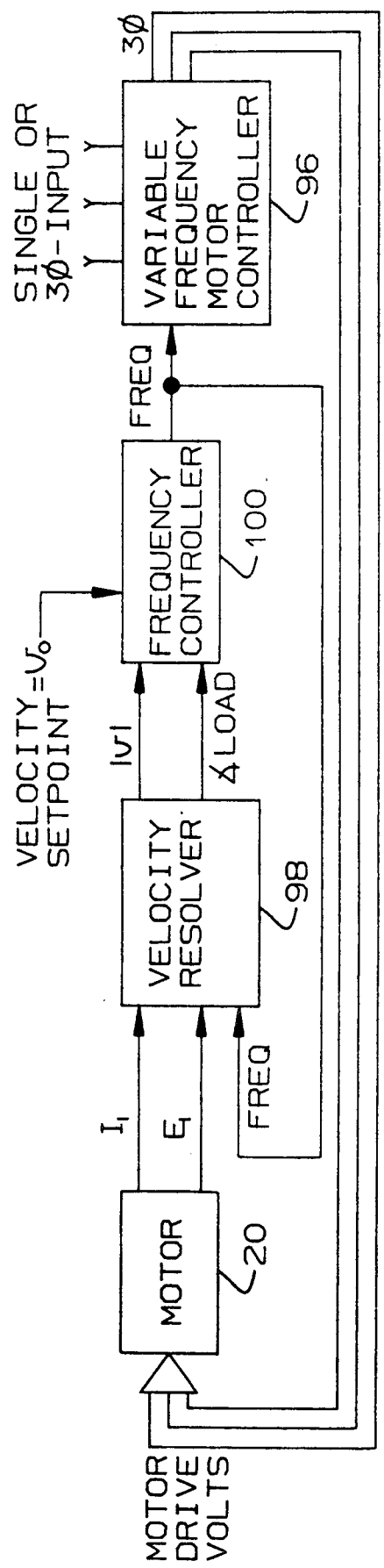
FIG. 8 is a block diagram, schematically showing a velocity control system for the electromagnetic orbital/vibrational motor illustrated in the preceding figures.

Referring to FIG. 8, there is shown a velocity control system for the electromagnetic orbital drive motor illustrated in the preceding figures.

It has been discovered in accordance with the invention that the third harmonic of the current passing through a coil of the motor may be used to monitor the orbital velocity. The orbital velocity may then be used to control the frequency of the three phase AC power supplied to the coils of the motor 20. The frequency of the power is controlled by a variable frequency motor controller 96 which may be of the type which is commercially available and is driven by an analog, slowly varying or dc signal (FREQ) which controls the frequency of the three phase output ($3\phi$) on the output lines from the controller 96 which provide the motor drive volts to the motor 20. The voltage $E_1$ and the current $I_1$ across one of the coils is used and applied to a velocity resolver 98 which is a circuit which performs analog or digital computations in accordance with the following equations:

$$|v| = K * |I_1^{(3)}| * FREQ^2/|E_1^{(1)}|$$
$$= \text{orbital velocity magnitutde}$$
$$LOAD = E_1^{(1)} - I_1^{(3)} = 0 \text{ at resonance}$$
$$< 0 \text{ at resonance}$$
$$> 0 \text{ at resonance}$$

From the equations it will be apparent that the load phase angle is represented as the phase angle between the fundamental of the voltage across the coil and the third harmonic of the current in the coil $E_1^{(1)}$ and $I_1^{(3)}$. The outputs from the velocity resolver are signals indicating the velocity of the load and the phase angle of the load. The load is carried by a flexural support system, which with the mass of the load and the stiffness of the support system, defines the resonant frequency of the mechanical system. The phase angle is 0 at resonance, negative below resonance and positive above resonance. The system uses a frequency controller 100, which may also be an analog computer or digital computer, which responds to the difference between the velocity output $|v|$ from the resolver 98 and the phase angle of the load. As long as the drive frequency (twice the AC power frequency in the orbital motor illustrated in the preceding figures) is below resonance, increasing the drive frequency increases the velocity. As long as the load phase angle is negative, the frequency is below resonance. When the load angle reaches 0, the system is at resonance and further increases in frequency will not increase the velocity. The frequency controller therefore operates in accordance with the following equations:

$$\text{If } (|v| < v_o) \text{ and } (\text{ LOAD} < 0)$$
$$\text{then increase FREQ}$$
$$\text{If } (|v| > v_o) \text{ then decrease FREQ}$$

and provides the FREQ controller input signal to which the controller 96 responds.

In addition, for velocity control, the current across all three coils may be monitored to give an average value of velocity as measured by each coil, thereby improving control resolution.

Referring to FIGS. 9, 10 and 11 there is shown a friction welder 102 having two electromagnetic orbital drive motors 104 and 106, each of a design similar to the motor 20 of the welder shown in FIGS. 1, 2 and 3. This welder has a massive support plate 108 mounted by shock mounts 110 on a framework 112. A hydraulically driven reciprocating platen 114 carries the stationary fixture part 116. The stationary part to be welded is illustrated as a thin thermoplastic plate 118. The part 120, which is to be moved, is mounted in the upper part 122 of the fixture. This part 122 is connected to a platen 126. The platen is connected to drive plates (not shown) or directly to the armatures 128 and 130 of the motors 104 and 106.

FIG. 11 illustrates the coils: coil 1, coil 2 and coil 3 of the motor 104 and the coils coil 1', coil 2' and coil 3' on the stator of the motor 106. A three pole switch changes the connections to coils 1', 2' and 3' of the three phase power which are applied to the lines indicated at $\phi 1$, $\phi 2$ and $\phi 3$. This is a mode selector switch. The switch provides for the generation of orbital force at twice the force provided by each motor onto the drive plate 126. Alternatively the motors may be operated with the mode selector switch to produce a reciprocating force of peak magnitude twice the force produced by each motor towards any pole. In other words, the peak magnitude of the sum of the forces applied by the motors to the drive plate 126 and then to the movable part 120 equals twice the peak magnitude of the orbital force of a single motor.

From the foregoing description, it will be apparent that there has been provided improved friction welders and improved orbital electromagnetic drivers (motors) which are especially suitable for use therein. Variations and modifications in the herein described welders and motors, within the scope of the invention, will undoubtedly suggest themselves to those skilled in the art; Accordingly, the foregoing description should be taken as a illustrative and not in a limiting sense.

I claim:

1. Apparatus for friction welding of parts at an interface therebetween which comprises means for driving one of said parts with orbital motion in an orbital plane with respect to another of said parts while said parts are held in contact at said interface, said means for driving including electromagnetic generating means for producing orbital force in said orbital plane, said electromagnetic force generating means comprising a single body of magnetic material providing an armature having a central axis perpendicular to said orbital plane and a plurality of poles distributed circumferentially by 360°/N, where N is the number of said poles about said axis, N being equal to or greater than 3, and a stator being disposed around said armature, said stator having a plurality of poles each opposed to a different one of said armature poles; means for holding said another of said parts; and means for mounting said one of said parts to execute orbital motion in response to orbital force generated by orbital motion of said armature and wherein said mounting means is attached to said armature.

2. The apparatus according to claim 1 wherein said armature and stator poles are perpendicular to said orbital plane and said electromagnetic means includes magnetic flux generating coils magnetically coupled to said stator poles for establishing flux which is directed through said armature along said axis.

3. The apparatus according to claim 2 wherein said stator is a single body of magnetic material ringing said armature from which said stator poles extend and which defines a return path for said flux.

4. The apparatus according to claim 3 wherein such stator poles and said armature poles execute relative displacement while executing orbital motion and have opposed faces spaced from each other by air gaps, the width of said gaps as measured along a line perpendicular to said faces being greater than the peak of said displacement of said armature in response to said orbital force.

5. The apparatus according to claim 4 wherein said armature is generally triangular in a plane perpendicular to said axis, each of said armature faces being along a different side of said triangle.

6. The apparatus according to claim 5 wherein said poles are 120° apart, and means for applying different phases of three phase AC power to each of said stator coils.

7. The apparatus according to claim 3 wherein said armature body and said stator body comprise separate stacks of laminations of magnetic material.

8. The apparatus according to claim 6 wherein said coils are connected in delta configuration.

9. The apparatus according to claim 6 wherein said coils are connected in wye configuration.

10. The apparatus according to claim 2 wherein said mounting means comprises a plate to which said armature is connected, flexural means for supporting said plate for orbital motion in a plane together with said armature, and a massive support for fixedly anchoring said stator and for anchoring said flexural means.

11. The apparatus according to claim 10 wherein said flexural means comprises spring means having the same stiffness in all directions in the plane in which said plate executes its orbital motion.

12. The apparatus according to claim 11 wherein said electromagnetic force generating means includes stator coil means operated by AC power, and wherein said mounting means including said plate and said armature and said one part has a total mass and stiffness which defines a frequency of resident vibration approximately at twice the frequency of said AC power.

13. The apparatus according to claim 11 wherein said springs are a plurality of rods disposed around and paralleling said axis, said rods being fixed at one end thereof to said support and at the other end thereof to said plate.

14. The apparatus according to claim 13 wherein different ones of said rods are displaced radially at different distances from said axis.

15. The apparatus according to claim 14 wherein said rods are disposed symmetrically about said axis with rods which are adjacent to each other in a direction circumferentially about said axis being respectively closer and further away from said axis in a radial direction, thereby counteracting tilting of said plate.

16. The apparatus according to claim 13 wherein said support comprises a support body more massive than said armature and said mounting means, a tubular structure connected to said plate and having an opening extending along said axis, said tubular structure being connected to said support body, said rods being disposed in said opening in said tubular structure and being fixedly connected thereto at one end of each of said rods.

17. The apparatus according to claim 16 wherein said electromagnetic force generating means including said armature and said stator are disposed in said opening in said tubular structure.

18. The apparatus according to claim 17 wherein said welding apparatus has a framework connected to said support body.

19. The apparatus according to claim 18 further comprising a fixture for receiving said one part including a platen connected to said plate, and another platen reciprocally moveable along said axis for supporting the other of said parts and moving said parts into contacting relationship at said interface.

20. The apparatus according to claim 1 wherein said driving means includes said electromagnetic force generating means as a first driver and second electromagnetic force generating means as a second driver both of which produce orbital force in said orbital plane, and means for applying electrical power to said first and second driving means for producing translational vibratory force in said plane alternatively to said orbital force.

21. The apparatus according to claim 1 wherein said stator poles each have a plurality of coils thereon, means for connecting said coils on one of said poles in parallel and the coils on the others of said poles in series, means for connecting said series and parallel connected coils to each other, and means for applying single phase AC power across one of said series and parallel connected coils so as to generate translational vibratory force instead of orbital force in said plane.

22. The apparatus according to claim 1 wherein said electromagnetic force generating means comprises means for controlling the velocity of said one part in said orbital plane.

23. The apparatus according to claim 22 wherein said electromagnetic force generating means includes at least one coil to which AC power is applied at a fundamental frequency, said controlling means comprises means responsive to a first signal related the magnitude of the current at the third harmonic of said fundamental frequency and the second signal related tot he phase angle between the voltage across said coil at said fundamental frequency and said current at said third harmonic for controlling the frequency of said AC power.

24. The apparatus according to claim 23 wherein said controlling means further comprises means for increasing said frequency when said second signal is negative and said first signal is below a certain magnitude and for decreasing said frequency when said first signal is above said certain magnitude.

25. The apparatus according to claim 1 wherein said interface is contained in said orbital plane.

26. The apparatus according to claim 1 wherein said mounting means comprises an array of stiff members for constraining said orbital motion to said orbital plane.

27. The method of friction welding of a pair of parts having thermoplastic material at surfaces thereof to be welded which comprises the steps of providing electromagnetic force generating means wherein said electromagnetic force generating means comprises a single body of magnetic material providing an armature having a central axis perpendicular to said orbital plane and a plurality of poles distributed circumferentially by $360°/N$, where N is the number of said poles about said axis, N being equal to or greater than 3, and a stator being disposed around said armature, said stator having a plurality of poles each opposed to a different one of said armature poles; holding said parts with said surfaces together in contacting relationship; generating orbital force to provide orbital motion of said armature with respect to said stator; generating frictional force to cause said surfaces of said parts to fuse by driving at least one of said parts with said armature and holding the other of said parts stationary so that said at least one of said parts executes orbital motion and orbits about axes perpendicular to said contacting surfaces and said frictional force is sufficient in amplitude to cause fusion at said surfaces, and terminating said frictional force and maintaining said parts which are being welded together after said frictional force terminates until they fuse together to form a weld.

28. The method according to claim 27 further comprising maintaining said surfaces in said plane while said orbital force is generated, said orbital plane being perpendicular to said axes.

* * * * *